United States Patent [19]
Jowett

[11] Patent Number: 5,762,784
[45] Date of Patent: Jun. 9, 1998

[54] CONTAINMENT OF WATER TREATMANT MEDIUM

[76] Inventor: E. Craig Jowett, 177 Cobblestone Place., PO Box 385 Rockwood, Ontario, Canada, N0B 2K0

[21] Appl. No.: 848,156

[22] Filed: Apr. 29, 1997

[51] Int. Cl.$^6$ .................................................. C02F 3/10
[52] U.S. Cl. ........................................ 210/150; 210/616
[58] Field of Search ............................... 210/615–617, 210/150, 151

[56] References Cited

U.S. PATENT DOCUMENTS

| | | | |
|---|---|---|---|
| 4,333,893 | 6/1982 | Clyde | 210/150 |
| 4,705,634 | 11/1987 | Reimann et al. | 210/616 |
| 4,871,450 | 10/1989 | Goodrich et al. | 210/151 |
| 4,983,299 | 1/1991 | Lupton et al. | 210/617 |
| 5,227,051 | 7/1993 | Oshima et al. | 210/150 |
| 5,403,487 | 4/1995 | Lodaya et al. | 210/150 |
| 5,458,779 | 10/1995 | Odegaard | 210/616 |
| 5,580,770 | 12/1996 | DeFilippi | 210/615 |

*Primary Examiner*—Thomas G. Wyse
*Attorney, Agent, or Firm*—Anthony Asquith & Co.

[57] ABSTRACT

The treatment medium comprises 5 cm cubes of soft, open-cell foam. The container basket is made from plastic mesh, arranged as a cylinder, 80 cm diameter, 100 cm high. The blocks are packed semi-tightly into the basket. The dirty water to be treated is sprinkled onto the foam from above. The container supports the saturated foam blocks in the air, and air circulates freely through the mesh. The container and blocks may be compressed for transport. A separate sub-container holds the top-most blocks, for easy replacement. Cleaned water drains out underneath the baskets. The baskets stand up on their own, and there is free service-access to the baskets during operation, for service.

19 Claims, 2 Drawing Sheets

CONTAINMENT OF WATER TREATMANT MEDIUM

BACKGROUND TO THE INVENTION

It is conventional to treat effluent water from a septic tank (which has already undergone an anaerobic fermentation reaction, and removal of solids, in the septic tank) by passing the water through a tile-bed, or other means for aerating the water. The resulting aerobic reaction is micro-biological, and requires a residence time generally of such length that the tile bed or other means has to be physically large (and therefore expensive).

In CA-2,096,175, the effluent water is passed over a heap of blocks of soft resilient foam material. The blocks are so heaped that air can circulate freely between and around the blocks. The foam is of the open-cell, or interconnected-cell, type, in which the water soaks into the interior of the blocks as well as being present on the outside surfaces of the blocks. As a result, a mix of aerobic and anaerobic conditions obtains in the blocks, and the reactions that take place reflect these conditions. This leads to a very efficient utilisation of the space envelope of the heap of blocks, in terms of the volumetric flow rate that can be treated in the heap, and also allows the heap to continue to function for long periods without a build-up of sludge.

The present invention may be regarded as a development of the technology shown in CA-2,096,175 in that the invention is aimed at providing a manner of containing the heap of blocks of foam material, for convenience of transport, and efficacy of operation. As will be explained, the invention may also be applied for the containment of other forms of treatment media.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
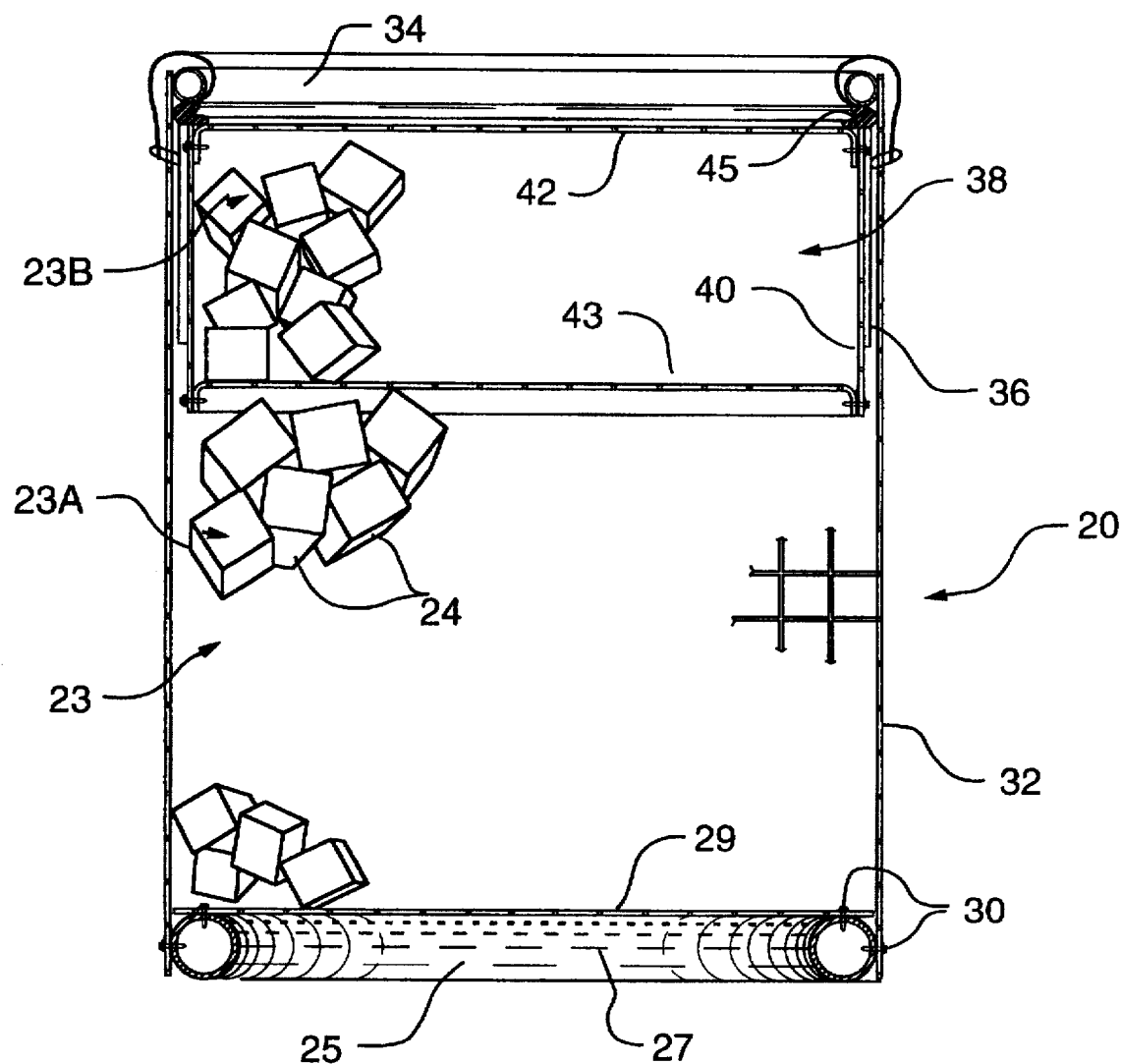
FIG. 1 is a cross-section of a basket, containing a heap of foam blocks, which embodies the invention.

FIG. 1 shows a basket 20 containing a heap 23 of blocks 24 of plastic foam. The foam is of the interconnected-cell type, which acts like a sponge to soak up and retain water. The blocks are e.g 5 cm cubes, and are arranged in a disordered heap, whereby air can pass freely between the blocks.

In use of the basket, effluent water—from a septic tank, for example—is sprinkled onto the heap 23 from above. The dirty water passes down through the heap, and emerges from below. The clean water that emerges is collected, or run-off, or discharged into the ground, etc, as required.

In use, after the heap has once been dosed with a charge of dirty water, the water quickly saturates the upper blocks, and in turn the lower blocks, such that, as each new charge is added to the top, a corresponding volume of water is discharged from the bottom of the heap shortly thereafter. Between dosings, the water remains more or less stationary in the blocks until the next charge is applied. Thus, all the water has a good residence time in the heap, descending gradually and progressively down through the blocks.

The length of the residence time is determined by the number and volume of the charges being dosed onto the heap over a period of time. The designer sets the size of the heap from the standpoint of providing a long enough residence time for the breakdown reactions to be completed, given the volumetric rate of dirty water being dosed onto the heap.

The plastic foam material is soft and resilient enough that the water-laden blocks, in settling upon each other, become squashed (slightly) at the points of contact, whereby the contact area between the blocks is large, and whereby, as a result, water can pass from block to block, without necessarily becoming exposed to the atmosphere.

Also, the large block-to-block contact area means that a volumetrically large flow rate of water can take place between the blocks, and this is important for the reason as will now be explained.

During periods of non-dosing, the water in the centres of the blocks remains stationary (being held there by the sponge-action of the foam). When dosing takes place, the water in the upper blocks is displaced by the incoming dose of (dirty) water: the displaced water from the upper blocks passes to the lower blocks, and so on, until a quantity of (clean) water emerges from the bottom-most blocks, being a quantity that corresponds in volume to the volume of water added in at the top.

After dosing is completed, and the corresponding volume has emerged from the bottom-most blocks, the water in the blocks stops moving. No more water emerges, and the water that remains in the centres of the blocks continues simply to remain stationary—until the next dosing.

Thus, during dosing, each block passes its charge of water down to the next block below, in what might by called a bucket-brigade mode of movement. During dosing periods, the water moves down, bodily, from block to block. During periods of non-dosing, the water remains stationary in the blocks. The water is passed bodily from block to block, the water gradually working its way down as subsequent dosings take place, from top to bottom of the heap.

When the contact areas between blocks are large (i.e when the foam is soft), this transfer of a large volume of water from block to block can easily take place. But if the contact areas between blocks were small (e.g if the foam were rigid), there would then be little tendency for this large-volume transfer of the water from block to block to take place, i.e there would little tendency for the bucket-brigade stop-start type of movement.

It is considered that it is the bucket-brigade mode of movement of the water bodily through the blocks that makes the soft foam system so efficient and effective a treatment system.

The structure of the basket 20 will now be described. At its foot, the basket includes a donut-shaped ring 25, which is made from a length of plastic drain-tubing, bent around to form a circle of e.g 80 cm diameter. The tubing is e.g 10 cm diameter, and its walls may include many slots 27 or other perforations, which allow passage of water therethrough.

Above the ring 25 is a grate 29, which is secured to the ring by means of plastic ties 30. The grid comprises a disk of plastic mesh material. The plastic mesh material has a mesh-aperture size e.g of 1.5 cm square, which is large enough to allow passage of water and air without any hindrance at all, but is small enough to contain the blocks 24 of foam.

The ties 30 pass through the slots 27, and through the mesh apertures. More sophisticated fasteners may be used, but it has been found that simple ties are functionally quite adequate.

A sheet of the plastic mesh material is curved around into the form of a right-cylindrical tube 32. The tube is secured at its base to the ring 25 and grate 29, again by means of the plastic ties. The tube 32 is e.g 100 cm high.

The top of the tube 32 is stiffened by the securement thereto of a ring 34 of plastic pipe, of e.g 2 cm diameter, which is bent around into a circle corresponding to the lower ring 25. The upper ring 34 is secured to the tube 32 of plastic mesh, again using plastic ties.

Secured at the top of the tube 32 also is a skirt 36, made of a geo-fabric material. This skirt extends partway down the tube 32, on the inside.

The heap 23 of foam blocks is in two portions. The lower portion 23A of the heap of foam blocks simply rests in the lower end of the tube 32. The upper portion 23B of the heap is housed in a separate container 38. The container 38, again, is made of pieces of the plastic mesh material. In this case, the pieces are a right-cylindrical tube 40, and top 42 and bottom 43 disks of the mesh material, which again are secured with plastic ties. The heap 23B is placed inside the separate container prior to the container being closed.

The separate container 38 is dimensioned to fit into the top of the tube 32. The container 38 may be placed into, and removed from, the tube 32 without disturbing either the heap 23A or the heap 23B.

In use of the basket 20 of FIG. 1, dirty water is sprinkled on top of the heap 23, and in fact on top of the upper heap 23A inside the separate container 38. The purpose of the skirt 36 is to retain any water that may splash, upon falling into the heap, and to prevent the splashed water from spilling over the sides of the basket. A collar 45 of foam material is placed around the top of the separate container 38, to prevent water from passing between the outside of the container 38 and the inside of the tube 32, and thereby by-passing the upper portion of the heap of blocks.

Once in operation, the blocks quickly absorb enough water to become saturated, and thereafter the blocks remain more or less saturated, more or less all the time. The cell-size, block-size, etc, of the foam material is selected such that, between dosings, the water remains largely stationary in the blocks, and does not drain down through the heap. It is possible, by correctly selecting the type of foam in accordance with the ambient conditions, for the blocks to remain in the saturated condition, even when no dosing is taking place, for several days.

Because the heap of blocks is disordered, there is ample air space between the blocks for a good flow of air to reach the blocks, and to reach even to those blocks lying in the middle of the heap. Therefore, the usual micro-biological aerobic reactions can take place, at least on the surfaces of the blocks.

The blocks being 5 cm cubes, inside the blocks is a zone where air does not penetrate, whereby conditions are more favourable, in the interior of the blocks, for more predominantly anaerobic reactions to take place. The anaerobic micro-biological breakdown reactions are generally not favoured in conventional systems. However, the provision of anaerobic conditions is advantageous, because the quantity of sludge produced therein is substantially less than in the aerobic reactions.

On the other hand, the anaerobic reactions generally can require a long residence time. It is noted, however, that, in the system as described, a long residence time is available due to the use of the open-cell foam in the baskets, whereby the anaerobic reactions may be promoted.

The use of the basket of open-cell foam blocks promotes a most advantageous mix of aerobic reactions on the outside of the blocks and anaerobic reactions in the interior of the blocks, whereby excellent breakdown performance is achieved over long periods with a minimum formation of sludge. As a result, greater dosing rates, in terms of liters of dirty water per day, can be processed through the basket than through e.g a conventional tile bed or soakaway, of comparable size or cost.

In the system as described, air can pass freely into the between-block spaces in the middle of the heap, through the wide openings in the plastic mesh materials forming the tube 32. However, although the openings in the mesh are large, it should be noted that the water does not tend to escape through these openings. The water tends rather to soak into, and be retained within, the blocks of foam. Thus, there is little or no leakage of the water out of the sides of the tube 32. In the system as described, it is particular noteworthy that no watertight container is required. Although the basket is full of holes, the foam blocks serve to contain the water within the basket, and the water does not leak out of the sides of the basket.

To emphasize the point: the basket contains, in the foam blocks, a considerable volume of water, the water being contained and supported at a considerable height above the floor; and yet the basket is not in itself watertight. None of the water leaks out of the basket even though the basket is made of large-aperture open mesh. Because of the large-aperture open mesh, air can enter and circulate freely between the blocks.

To prepare the basket for use, the basket is simply set upright, on e.g a grid or grille for collecting the (clean) water that drains out of the bottom of the basket. Generally, the basket (or, more usually, the half-dozen or so baskets required for a typical installation) will be housed in some sort of shed or other outbuilding, but apart from that the ancillary structures required for the baskets are almost negligible, at least in the context of conventional treatment systems. In many cases, the water draining out from the baskets can simply be left to drain into the ground.

One of the problems of conventional water treatment systems is the extent of the on-site construction and engineering works. Not only is this expensive, but it is generally not possible for inspection etc to be carried out with the same degree of attention as could easily be provided if the works were done on an in-factory basis. The use of the basket as described herein alleviates this problem. The basket is prepared as a finished assembly, foam blocks and all, in-factory.

The finished basket is light in weight, and very easily shipped. One benefit that arises from the fact that the walls are made of plastic mesh is that the tube 32 can be collapsed axially. The whole basket, including the separate container 38, may be compressed (in an in-factory operation), conveniently by about 70 percent, i.e down to about 30% of its nominal axial height dimension. The compressed basket may be packaged or banded in the compressed condition, ready for shipping. For a typical small installation, the compressed basket would be 30 cm high and 80 cm diameter, whereby a number of the packages may even be carried on a light aircraft, for instance, and certainly on a small boat; thus, even a primitive dwelling in a remote area may be provided with a high-performance water treatment facility. The packages are also useful for very quickly and inexpensively providing a water-treatment-station, e.g for temporary large gatherings of people, or after a disaster has destroyed regular facilities, or during military operations, etc.

Upon release from its packaging, the foam often takes a little while to fully regain its original size, but that delay is not important. The foam has enough natural resilience to expand, and in doing so to draw the mesh tube 32 up to its nominal size. Once the tube has gained its normal size, although the mesh has very little structural rigidity in itself, the mesh tube 32, when filled with foam blocks, in fact has considerable rigidity—ample, at any rate, for the basket to be handled and operated as a unitary structural entity, even when the blocks are saturated with water. The basket may be supported on a wheeled trolley for movement of the basket when the blocks are saturated, if it should be necessary to service one of the baskets. When the blocks are dry, the basket, and the contained blocks, are light enough to be easily picked up by a person.

The blocks are packed semi-tightly in the basket. That is to say, the blocks are not packed so tightly as to close down the large air spaces between the blocks, but on the other hand the blocks are packed tightly enough to create enough contact force between the blocks that the blocks substantially do not move relative to each other. It is important that the blocks do not move relative to each other, because if they did, the spaces between the blocks would inevitably be reduced in size, to the extent that the spaces between the blocks might become too small for adequate air circulation. The blocks should be packed in the basket in such a manner that friction between the blocks holds the blocks in the same relative positions during operation, when the blocks are saturated, and also during transport, when the blocks are dry. Also, the blocks should be packed tightly enough that the blocks substantially do not move relative to each other during the period of expansion of the blocks after a period of transport in a compressed condition.

Preferably, the nature of the basket should be such that the basket will collapse in unison with the compressing of the blocks, prior to packaging for transport, and should be such that the basket will expand in unison with the expansion of the blocks, after the packaging has been released. Just as it is important that the blocks do not move relative to each other, so it is important that the blocks substantially do not slide relative to the mesh of the basket. Such sliding relative to the mesh is especially possible at the time when the blocks are undergoing the expansion motions, after being released from compression. If it were allowed to occur, a re-arrangement of the blocks relative to each other, and relative to the mesh, would result in a reduction of the air spaces between the blocks; and it may be noted that such reduction would tend to snowball, in that once the air spaces started to be reduced, the whole heap of blocks would be packed less tightly, which would allow any further relative movement of the blocks to occur all the more readily. Of course, some movement of the blocks relative to the mesh is bound to occur during expansion following release from packaging, but the designer should seek to keep such movement to a minimum. The mesh should be selected on the basis of little or no structural rigidity in the mesh itself; that is to say, the rigidity of the basket containing the heap of foam blocks, as a unitary entity, arises from the fact that the blocks of foam are packed in the basket under a small degree of compression (i.e semi-tightly, as explained), and not from any inherent rigidity of the mesh of the basket.

The upper container is provided in order to allow the upper portion of the heap of blocks to be easily replaced.

After a period of use of the basket of foam blocks, the upper areas of the heap of blocks may become dirty and discoloured (and possibly malodorous), and may contain a build-up of solids. In that case, the upper portion 23A of the heap, i.e just the portion inside the container 38, may be removed and replaced. The lower portion of the heap will, in all probability, be still clean and serviceable.

Figure 2:
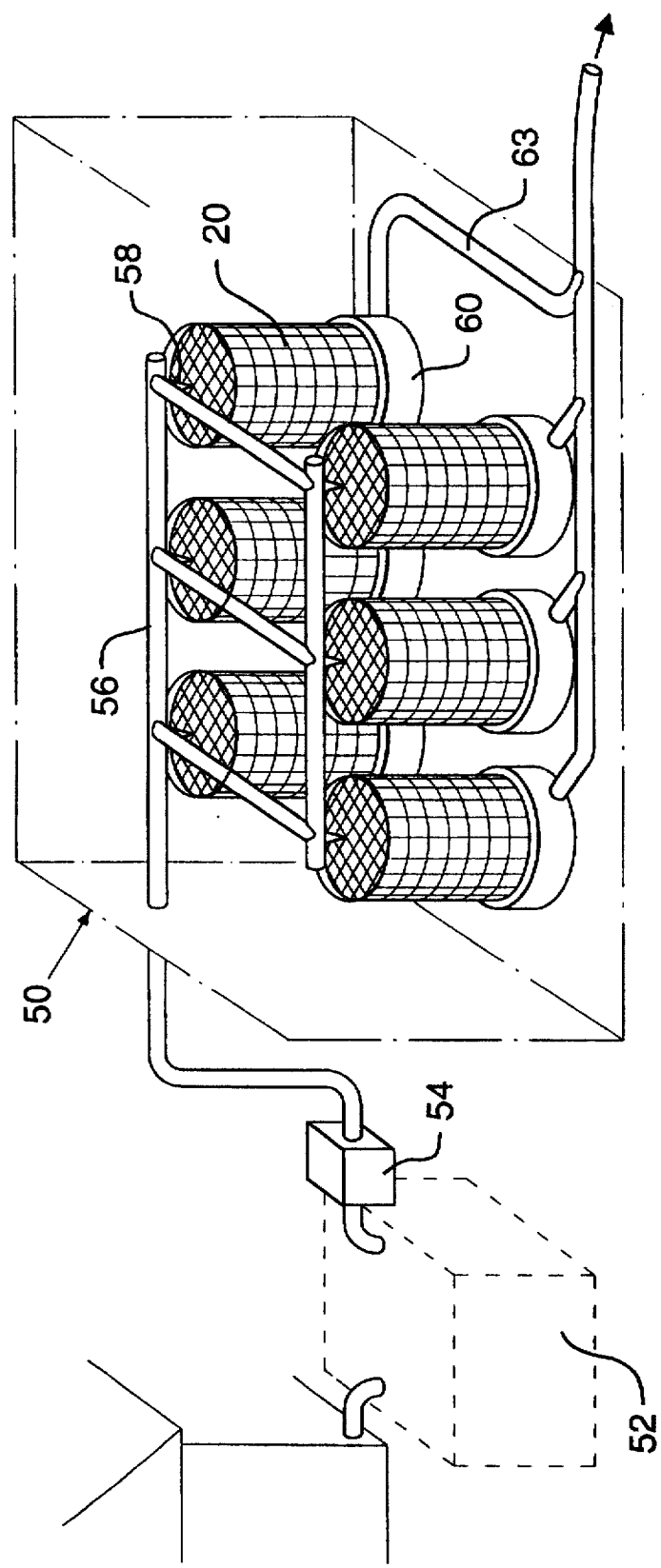
FIG. 2 is a diagram of a site installation, which uses the baskets of FIG. 1.

FIG. 2 shows an out-building 50 of the type in which a number of the baskets 20 may be housed, in a typical installation. Dirty water from a septic tank 52 is pumped (pump 54) into a manifold 56. The manifold is provided with sprinklers 58, one for each of the baskets. The sprinklers 58 are adjustable, so that they may be set to dose the several baskets equally (or unequally, if desired).

Each basket rests on a collector 60, into which clean water drains, from the bottom of the basket. Pipes 63 convey the clean water away. The clean water may be discharged straight into a stream or lake, or into the ground, etc, as local conditions may dictate.

If convenient, the floor of the outbuilding may be the actual ground, and be such that the water can be left to soak directly into the floor, and into the ground: in that case, the baskets may just rest on the floor, and no collection piping such as 60,63 is required. Gravel may be spread on the floor, where direct discharge onto the floor is being contemplated.

The arrangement of the outbuilding 50 is such that a person may walk around and between the baskets, e.g for inspection and maintenance purposes. The baskets are sufficient in themselves to contain the water. This may be contrasted with conventional systems. In conventional systems there is no access to the treatment medium, whether the medium is in the ground, or the medium is in a tank or other container above ground. It should be noted that the conventional systems cannot contain the water, and at the same time permit access to the sides of the treatment medium. The systems as described herein may be regarded as supporting the dirty water up in the air; this not only provides for excellent micro-biological treatment, but it also permits physical access to the treatment medium, during treatment.

Apart from the mesh tube 32, no other container or containment is needed in the system as described herein. Because of the sponge-action of the blocks of foam, even though the sides of the basket are completely open to the passage of air (and water), in fact no water leaks out of the cylindrical sides of the basket. The water is retained in the heap of blocks by the absorbency of the foam. (It will be understood that some slight trickles of water may in practice leak along the sides of the tube 32, but, in the context of a water treatment system, the quantity is negligible.) The basket as described has the effect of allowing free access of air to the blocks, and yet the basket serves as a non-leaking container of a large quantity of water.

The advantage that a person may walk around and between the baskets is achieved even though the baskets contain large volumes of water, and even though air is freely circulating around and between the (saturated) blocks of foam in the baskets. There is no need for a watertight or enclosed tank or other vessel to contain the water. The baskets just rest on the ground. The baskets are available for inspection and service at any time, and are available one at a time without affecting the others. In conventional systems, there is need for access into a tank, or the like, which must be drained to get at the medium in which the bio-reactions are taking place.

In places with cold winters, precautions should be taken against the system freezing. In the case of a cottage which is unattended over the winter, however, the system can be left to freeze: although no treatment takes place when frozen, the system may be expected to recover automatically (i.e without the need for attention) and resume operation, when spring comes.

If the system is being operated on a day to day basis, whereby water is being dosed into the system every day, generally enough heat is generated by the treatment reactions that the system can be expected not to freeze up. The anaerobic reactions favoured in the system as described (but not in conventional systems) take place inside the interiors of the blocks, whereby the heat generated by the reactions is somewhat more insulated from the cold than in conventional systems, and whereby the reactions may continue down to lower ambient temperatures.

The baskets are self-contained treatment units, each requiring only a means for supplying dirty water thereto, and a means for collecting and conveying away the cleaned water. As such, the system is modular, in that further baskets may easily be added later, whereby the capacity of the system is simply increased pro rata. In a conventional system, by contrast, the prudent designer had to include a margin of capacity to cater for future demands on the system, on the basis that it was very expensive to come back later to upgrade the system. No such initial over-engineering is required with the modular system as described.

As described, the modular basket system is suitable for use in treating the effluent of a domestic septic tank. Larger systems may arise, for example, when a number of home-owners decide to pool their water treatment. Larger baskets may be used, or more of them. A heap of foam blocks up to about 2 meters high is fine, but above that the weight of the saturated blocks above can tend to compress the blocks together in the lower portions of the heap, whereby air cannot circulate freely. However, because the circulation air enters through the open mesh of the sides of the basket, it is not too important if the lower blocks do tend to become saturated and close up. In order for the blocks to be aerated, the system does not require a supply of air to be piped in from underneath.

If the tube is made of a rather narrow diameter, the blocks can be expected to bridge across and take mechanical support from the sides of the basket, and thus to remain un-compressed, even though the basket may be quite tall. Thus, a 1 meter diameter basket may be satisfactory at a height of 4 meters, in that even at that height the lower blocks are still open enough to pass water, and apart enough to receive the circulating air. As mentioned, even if compaction of the lower-most blocks does occur, air does not move in from the bottom but through the sides, and treatment will continue.

Preferably, the basket has a height to diameter ratio of between 1 and 2.

The baskets may also be used in still larger systems. For example, a set of baskets may be used to treat leachate from e.g a landfill site, which may contain ammonium, solvent organics, hydrocarbons, metals, etc. Again, the combination of reactions that result from the water being present in the air-lean interiors of the blocks, and on the air-rich surfaces of the blocks, is useful for the treatment of such leachates.

The presence of the removable basket, i.e the separate container 38, is especially important in leachate treatment, because of precipitation of non-degradable minerals such as calcium carbonate, iron (and aluminum, manganese, etc) hydroxides. These need to be removed periodically. To carry out this maintenance, a person may just walk into the place where the baskets are housed, and, in a moment, change the upper basket. The task is trivial, compared with what is needed to carry out the same maintenance in a conventional system.

As regards the need to keep the air moving over the blocks, it may be noted that sometimes natural ventilation in the out-building may be adequate: if not, often a single ventilation fan is all that is needed, to ensure enough air circulation for a whole group of baskets.

In another approach to the structure of the baskets, the baskets are suspended from above. Now, the basket may rather be described as a bag. The bag is hung up so that the water drips out of the bottom of the bag. Again, the bucket-brigade mode of movement of the water is achieved, each dosed charge progressively working its way down through the heap of blocks during subsequent dosings, rather than moving down the heap of blocks in a constant (but very uneven) trickle. The bag is made of e.g cloth netting, such as potato or onion sack material. Again, the criterion is that the bag material be wide-open-mesh, the apertures being small enough to contain the blocks, but large enough to permit free circulation of air between the blocks.

Whether the basket rests on the ground, or is suspended from above, the wide-open-mesh material does not need to have structural integrity in itself. On the other hand, of course the basket may be made of self-supporting material, such as a plastic tub or drum. The required air circulation may be achieved by providing suitably-sized through-perforations in the material of the sides and base of the drum.

The invention has been described as it relates to the containment of blocks of softly-resilient open-cell foam. However, other types of treatment media may be contained in the manner as described. In assessing what type of treatment medium material can be used with an apertured container, the following points may be noted.

The invention provides that the container is of material that has apertures. It is the fact that the container has apertures that allows air to circulate over and between the blocks of foam, and over and between the water that is retained by and within the blocks.

Of course, the apertures must not be so large that the blocks can physically fall out of the apertures. But it is recognised that the water in the treatment medium material does not fall out through the open apertures in the container because the treatment medium material retains the water.

In other words, because the water is being retained in the blocks, the container itself is not required to be watertight. Therefore the container can have apertures, and the air that is needed to be circulated around and between the blocks can come in through the apertures. If the container had to be watertight, there could be no apertures in the container, and therefore the needed air could not come in through the apertures.

Water is able to drain down from block to block when a dose of dirty water is added on top of the medium. This is achieved in the medium as described above by the large block-to-block interfaces that result when soft foam blocks are (lightly) squashed together.

If the blocks were not soft, but were rigid, the block-to-block interface areas would then be too small for water to pass from the interior of one block to the interior of the block below. The water would simply trickle down the outsides of the rigid blocks. That is to say, if the medium were to comprise rigid blocks with small interface areas, then insofar as the water moved down the medium, the mechanism of that movement would be that the water would drain down the outsides of the blocks.

Of course, in the case where the blocks, though rigid, are of interconnected-cell or open-cell material, the blocks will tend to contain and retain a volume of water; but it is noted that, where the blocks are rigid and the interface area between blocks is small, the water actually inside the blocks substantially will not move. That is to say, water on the outsides of the blocks would drain down and away between dosings, but water on the insides of the blocks would remain static, and become stagnant.

The medium would not be satisfactory if the areas of the interfaces between the blocks were so small that water could not pass from the interior of one block to the interior of the block below. In other words, the block-to-block interface area has to be large enough that water can pass from the interior of one block to the interior of the block below. However, on the other hand, the interface area has to be small enough to act as a constriction. If the interface did not constrict the flow, all the water inside the upper block would drain out of the upper block through the interface.

The constriction provided by the reduced interface area has to be tight enough that a certain volume of water will be retained in the block above the constriction. This volume may be regarded as the equilibrium-volume that can be supported by the constriction; if the block contains a volume of water in excess of the equilibrium-volume, the excess water will drain down through the constriction; if the block contains only the equilibrium-volume, that volume of water will remain held up in the block.

It is the capillary action acting on the water that serves to hold the water up in the block. The force tending to make the water flow through the constriction is gravity; if more water is added to the block, the pressure head increases until it overcomes the capillary effect; flow commences, and continues until the volume of water remaining in the block (the equilibrium-volume) is once again small enough that the capillary effect at the constriction can support it.

Therefore, flow stops when there is still a volume of water left in the blocks. Flow through the constriction only resumes if and when more water enters the block (from above), thereby creating a pressure differential on the constriction that is more than can be supported by the capillary action.

To summarise, for water to be held up in the blocks, the constriction has to be small (tight) enough that capillary action can stop the flow of water through the constriction. Also, the constriction has to be tight enough that the equilibrium-volume of water left in the block when the flow stops comprises a worthwhile volume of water. But the constriction must not be too small, or the water will simply trickle down the outsides of the blocks; the constriction has to be large enough to permit block-to-block flow to start when the volume of water in the upper block exceeds the equilibrium-volume.

It is recognised that it is when the interface areas are just right, in this sense, that supporting the medium in the apertured-container, as described, is so advantageous.

It is recognised that the blocks of softly-resilient foam, heaped as described, provide just the right interface area— i.e not too small, not too large—whereby water does collect in the blocks, and that water is transferred from block to block as dosings occur.

In general, the apertured container can be provided when the treatment material is of such a nature that, when water is applied to the body of treatment material from above, the treatment material is capable of retaining some of the water within the material, and of holding such retained water temporarily against passage down through the material.

Preferably, the nature of the treatment medium is such that the retained water is retained in the form of many separate discrete volumes of water, and the body of material is so arranged that air can circulate over and between the retained volumes of water.

The apertured container can also be provided when the treatment medium comprises a quantity of blocks of treatment material, and the nature of the material is such that water applied to a block of the material is received into the block, and is retained in the block. The blocks are in water-conducting communication with each other via inter-block water-conducting means, which comprise means for allowing water to drain from higher blocks to lower blocks. In respect of each interblock water-conducting means, the means includes a constriction. The nature of the constriction is such that the constriction affects the free drainage of water from a higher block, above the constriction, in that the constriction provides support for an equilibrium-volume of water in the higher block above the constriction, to the extent that if water in the higher block exceeds the equilibrium-volume the excess water drains down through the inter-block water-conducting means, and if the volume of water in the higher block is less than the equilibrium-volume substantially no water drains down through the inter-block water-conducting means.

I claim:

1. Water treatment apparatus, comprising a treatment medium, and a container for containing the treatment medium, wherein:

the treatment medium comprises a quantity of blocks of soft, resilient, open-cell, foam;

the container has walls, which define a hollow interior of the container;

the container stands in, and is open to, the atmosphere;

the blocks are arranged inside the hollow interior of the container, in a heap that is characterised in that the blocks touch each other at individual points of contact, and in that apart from the points of contact large spaces exist between the blocks whereby air may circulate freely over and between the blocks;

the walls of the container are made from a container material that includes apertures;

the apertures are large enough and open enough that air may circulate freely therethrough, into and out of the container, and over and between the blocks located therein;

the apertures are small enough, in relation to the size of the blocks, that the container material contains the blocks.

2. Apparatus of claim 1, wherein the foam blocks are 5 cm cubes, and the container material is a mesh having 1.5 cm apertures.

3. Apparatus of claim 1, wherein the container material is flexible, and, in itself, has substantially no structural rigidity.

4. Apparatus of claim 3 wherein the blocks of foam are packed semi-tightly into the container.

5. Apparatus of claim 4 wherein the container, with the blocks of foam packed semi-tightly therein, forms a substantially self-supporting unitary structure.

6. Apparatus of claim 1, wherein the container includes a skirt, which is so positioned in relation to the top of the container as to catch splashes of dirty water sprinkled onto the treatment medium from above.

7. Apparatus of claim 1, wherein:

the container comprises a main-container and a sub-container;

some of the foam blocks are contained in the sub-container;

the sub-container is so located in relation to the main container that dirty water sprinkled onto the treatment medium from above encounters first the foam blocks in the sub-container;

the sub-container, and the foam blocks contained therein, are removable from the container as a unit, whereby the foam blocks which are first encountered by the dirty water can be readily removed from and replaced in the apparatus.

8. Apparatus of claim 1, wherein the container comprises a right-cylindrical vertical tube of mesh material.

9. Apparatus of claim 8, wherein the tube has a height to diameter ratio of between 1 and 2.

10. Apparatus of claim 1, wherein the container and the blocks of foam therein are arranged in a transport package, in which the container and the blocks are compressed linearly, to a substantial degree.

11. Apparatus of claim 10, wherein the container and the blocks of foam therein, when arranged in the transport package, are compressed linearly by approximately 70 percent.

12. Apparatus of claim 1, wherein the container comprises a means for supporting the treatment medium blocks to a substantial height up in the air, being a height of the treatment medium that is not immersed under a level of water.

13. Apparatus of claim 1, wherein:

the apparatus includes a means for sprinkling dirty water to be treated on top of the treatment medium in the container;

and the apparatus includes a means for collecting and conveying away cleaned water emerging from the treatment medium.

14. Apparatus of claim 1, wherein the apparatus includes an enclosure, in which are housed several of the said containers, each containing a respective heap of the foam blocks, and wherein the several containers are so disposed in the enclosure that a person may have access to the containers, for service purposes, during operation of the apparatus.

15. Apparatus of claim 1, wherein:

the container material is flexible, and, in itself, has substantially no structural rigidity;

the blocks of foam are packed semi-tightly into the container;

the container, with the blocks of foam packed semi-tightly therein, forms a substantially self-supporting unitary structure;

the container includes a skirt, which is so positioned in relation to the top of the container as to catch splashes of dirty water sprinkled onto the treatment medium from above;

the container comprises a main-container and a sub-container;

some of the foam blocks are contained in the sub-container;

the sub-container is so located in relation to the main container that dirty water sprinkled onto the treatment medium from above encounters first the foam blocks in the sub-container;

the sub-container, and the foam blocks contained therein, are removable from the container as a unit, whereby the foam blocks which are first encountered by the dirty water can be readily removed from and replaced in the apparatus;

the container comprises a right-cylindrical vertical tube of mesh material;

the container comprises a means for supporting the treatment medium blocks to a substantial height up in the air, being a height of the treatment medium that is not immersed under a level of water;

the apparatus includes a means for sprinkling dirty water to be treated on top of the treatment medium in the container;

and the apparatus includes a means for collecting and conveying away cleaned water emerging from the treatment medium.

16. Water treatment apparatus, comprising a treatment medium, and a container for containing the treatment medium, wherein:

the treatment medium comprises a body of treatment material;

the body of treatment material is permeable to the passage of water down through the material, under the action of gravity;

the treatment material is of such a nature that, when water is applied to the body of treatment material from above, the treatment material is capable of retaining some of the water within the material, and of holding up such retained water temporarily against passage down through the material;

the body of treatment material is so arranged as to be open to the circulation of air through the body;

the walls of the container are made from a mesh material, which defines apertures;

the apertures are large enough and open enough that air may circulate freely therethrough, into and out of the container, and over and between the blocks located therein;

the apertures are small enough, in relation to the size of the blocks, that the mesh material contains the blocks.

17. Apparatus of claim 16, wherein the nature of the treatment medium is such that the retained water is retained in the form of many separate discrete volumes of water, and the body of material is so arranged that air can circulate over and between the retained volumes of water.

18. Apparatus of claim 16, wherein the body of treatment material is flexible and is capable of being substantially compressed, and the nature of the container is such that it can be compressed in unison, when the body of treatment material is in the container.

19. Water treatment apparatus, comprising a treatment medium, and a container for containing the treatment medium, wherein:

the treatment medium comprises a quantity of blocks of treatment material;

the nature of the material is such that water applied to a block of the material is received into the block, and is retained in the block;

the blocks are in water-conducting communication with each other via inter-block water-conducting means, which comprise means for allowing water to drain from higher blocks to lower blocks;

in respect of each inter-block water-conducting means, the means includes a constriction;

the nature of the constriction is such that the constriction affects the free drainage of water from a higher block, above the constriction, in that the constriction provides support for an equilibrium-volume of water in the higher block above the constriction, to the extent that if water in the higher block exceeds the equilibrium-volume the excess water drains down through the inter-block water-conducting means, and if the volume of water in the higher block is less than the equilibrium-volume substantially no water drains down through the inter-block water-conducting means;

the treatment medium is so configured that air can circulate over and between the blocks;

the walls of the container are made from a mesh material, which defines apertures;

the apertures are large enough and open enough that air may circulate freely therethrough, into and out of the container, and over and between the blocks located therein;

the apertures are small enough, in relation to the size of the blocks, that the mesh material contains the blocks.

* * * * *